(12) United States Patent
Stieff

(10) Patent No.: US 7,872,220 B1
(45) Date of Patent: Jan. 18, 2011

(54) ELECTRONIC FIBER OPTIC SEAL MONITORS

(76) Inventor: Charles B. Stieff, 9507 E. Stanhope Rd., Kensington, MD (US) 20795

( * ) Notice: Subject to any disclaimer, the term of this patent is extended or adjusted under 35 U.S.C. 154(b) by 1506 days.

(21) Appl. No.: 11/074,313

(22) Filed: Mar. 7, 2005

Related U.S. Application Data

(60) Provisional application No. 60/549,916, filed on Mar. 5, 2004.

(51) Int. Cl.
*G01J 1/04* (2006.01)
(52) U.S. Cl. .................................. 250/227.14; 250/221
(58) Field of Classification Search ............ 250/227.14, 250/227.15, 227.16, 227.23, 221; 340/505, 340/512, 541, 555, 556, 557, 984, 539, 431, 340/531
See application file for complete search history.

(56) References Cited

U.S. PATENT DOCUMENTS 4,857,727 A * 8/1989 Lenz et al. .................. 398/168

7,104,851 B1 * 9/2006 Gonring et al. ................. 440/1

* cited by examiner

*Primary Examiner*—Que T Le
(74) *Attorney, Agent, or Firm*—James Creighton Wray

(57) ABSTRACT

The new seal monitor uses of a time dependant pseudo random number or a number from a time pad, which are lists of random numbers often used in encryption. This number changes periodically, for example, once an hour or whatever time interval is deemed timely by the particular application. It is intended that a remote monitoring station would send a request to the monitor and the monitor would respond with the random number that dependant on the time the monitor was started and how much time has elapsed. If the random number returned is correct it infers that the monitor is operating correctly and the seal has not been tampered with. If the monitor does not respond or responds with an incorrect number then the monitor or the seal has been tampered with. Light through a cable is periodically compared with historic outputs from that cable.

15 Claims, 7 Drawing Sheets

Figure 5

Insert Cable End

Start Clock

Transmit Time and Code

Detect Light (Dark)

Store Dark Light

Detect Light (LED)

Store LED Light

Receive Poll

Start Timer

Detect Dark Light

Compare Dark Light

Light LED

Detect Lighted Light

Compare Lighted Light

When Dark and Lighted Match

Clock Code

Output Code

When No Match

Output Time

Or No Output

Or Alarm

ELECTRONIC FIBER OPTIC SEAL MONITORS

This application claims the benefit of U.S. Provisional Application No. 60/549,916, filed Mar. 5, 2004, which is hereby incorporated by reference in its entirety.

BACKGROUND OF THE INVENTION

Fiber Lock seals are manufactured by E. J. Brooks, one of the world's largest manufacturers of security seals. The E. J. Brooks/Fiber Lock Sealing system consists of a jacketed bundle of light transmitting optical fibers whose two ends are securely held in a tamper indicating and tamper-resistant plastic block. An electronic monitor, which transmits a light pulse through the fiber optic bundle, can detect and report either locally or remotely the seal integrity and monitor status. After the seal is assembled, there is also a means of uniquely identifying each seal based on a digital image of the physical and optical properties of the fibers of the bundle.

Needs exist for improved electronic fiber optic seal monitors.

SUMMARY OF THE INVENTION

The new seal monitor uses of a time dependant pseudo random number or a number from a time pad, which are lists of random numbers often used in encryption. This number changes periodically, for example, once an hour or whatever time interval is deemed timely by the particular application. It is intended that a remote monitoring station would send a request to the monitor and the monitor would respond with the random number that dependant on the time the monitor was started and how much time has elapsed. If the random number returned is correct it infers that the monitor is operating correctly and the seal has not been tampered with. If the monitor does not respond or responds with an incorrect number then the monitor or the seal has been tampered with.

The new monitor has two parts one that monitors the fiber-optic loop and another that handles the polled request to send the time dependant pseudo random number and updating the local LDC display if needed.

The monitor has an LED to send light pulses through the seal fiber optic bundle and a light detector usually a photodiode to detect the light pulses. The monitor also contains an electronic circuit to amplify the detected pulses and an analog to digital converter to measure the strength of the amplified signal.

The new fiber optic monitor circuit works with several steps. First, the monitor measures the amount of light (digital value) in the fiber-optic cable with the LED off and compares the value to previous LED off values to detect tampering. Immediately after the "LED off" reading is completed the monitor turns the LED on. The monitor then measures the light level on the other end of the cable from the LED and compares it to previous LED on values to detect tampering.

The LED is turned off and the monitor cycle starts over after a short time interval, for example a ⅒ of a second delay. The time interval between monitor cycles can be changed depending on the needs of the application and the amount of power available to the monitor. As an example, the LED is on for about 80 microseconds. The power consumption of the fiber-optic monitoring side of the circuit is minimal even though the LED draws significant current. A photo-diode is used as the detector, and the measurements are made by a 10-bit analog to digital converter although the resolution of the analog to digital converter may be changed to meet specific needs of the application.

An independent reporting cycle runs concurrently monitoring cycle.

Every 5 seconds or what ever time interval is required by the specific application the monitor turns on its communications port and checks to see of it is being polled. Landline, infrared or radio frequency communication may be used as required.

If the receiver detects that it is being polled, it sends or transmits the current value of the time dependant random number and any application specific data like the monitor serial number, environmental data or GPS information.

If the random number is not correct, the remote monitor can request that the internal clock's time value be sent to verify that the monitor's internal clock is functioning correctly. If the monitor gets very cold, far below zero degrees F. for instance, the clock's time value may drift from the correct time value.

The polling information may be save into a log that resides in the onboard memory of the monitor. This information could be downloaded at the destination to document when and where the monitor was polled.

The communications port is then turned off for another 5-second cycle. The time interval can be modified as need by the application.

It is intended that the monitor would run up to 18 months or more on internal batteries.

The monitor may also monitor any fiber-optic loop that does not have a seal. The monitor does not have to monitor a Fiber Lock seal, but may monitor other seals as well.

As an example, a seal monitor is connected to a coil of 25 feet of fiber-optic cable with both ends crimped into a Fiber Lock seal, which is inserted into the monitor such that one end of the fiber optic bundle is aligned the LED and the other end is aligned with the photodiode. The monitor is also plugged into a RS-232 communications cable, which is used for remote monitoring. An LCD display, for example, shows would display a pseudo random number and system clock.

The random number changes at predetermined time intervals as determined by the user's application and the sensitivity of the contents of the object being sealed. The system clock is necessary so that if the internal monitor's time drifts due to changes in temperature, the remote site can request the clock value to calculate the correct random number if the clock is still within normal bounds but is not in the same interval.

A unique attribute of the monitor of the present invention is the use of a polled "time dependant" pseudo random number or a number from a time pad (a list of random numbers often used in encryption). This number changes once an hour or whatever time interval is deemed timely by the particular application. A remote monitoring station sends a request to the monitor and the monitor would respond with the random number that dependant on the time the monitor was started and how much time has elapsed. If no automated polling device is available the random number displayed on the monitor's LCD display may the manually phoned into the remote monitoring facility over unsecured lines to verify seal integrity. The remote monitoring station may also provide a detailed list of where and when a monitor was polled to clients.

Several new features are created by use of the Fiber Lock seals and the new monitors. Multiple objects can be sealed and monitored with a single length of fiber optic and one seal body and monitor. Fiber optic cable lengths of up to 50 m or longer may be monitored. The electronic monitor output is adaptable to a variety of user specific applications. The method where the monitor communicates with the remote monitoring facility meets the needs of the application. Communication may include RS-232, RS485 or modems for landlines, infrared or other wireless communication interfaces or any interface that is specified by user requirements.

The electronic seal monitor may be configured to display seal status on a local LCD or to communicate the seal status to remote monitoring stations. Photomicrography of seal fiber bundle fingerprint ensures that the seal has not been defeated even if the electronic monitor fails. Monitoring provides that assurance periodically and reports damage to seals in substantially real time. The monitor identification, the time and the changeable seal integrity code are transmitted, usually in response to periodic queries. Encoding allows existing communications to be used. GPS encoders can be connected to the monitors to provide information on where the seal was disturbed. The monitors are reusable, however the seals are not.

In the event that the electronic monitor is harassed and fails or fails from natural causes, the integrity of the seal can be established by comparing the seals original "fingerprint" with an image of the end of the fiber optic bundle prior to removing the seal.

These and further and other objects and features of the invention are apparent in the disclosure, which includes the above and ongoing written specification, with the claims and the drawings.

BRIEF DESCRIPTION OF THE DRAWINGS

FIG. 5 shows steps in use and operations of the monitor.

DETAILED DESCRIPTION OF THE PREFERRED EMBODIMENTS

Figure 1:
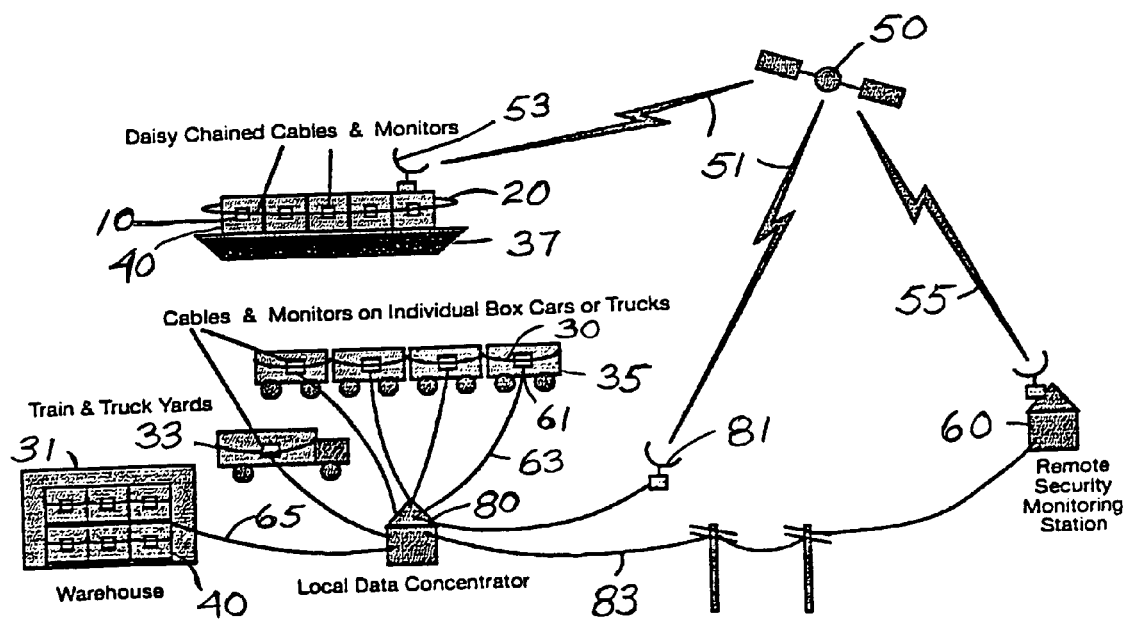
FIG. 1 shows examples of uses of the new monitors with seals.

Referring to the drawings, FIG. 1 shows examples of uses of the new monitors 10 with elongated fiber optic cables 20 in seals 30 on containers 40 in warehouses 31, on trucks 33 and railroad cars 35, and in and on vessels 37, which are ships or barges. Satellite 50 receives and transmits signals 51 from transceiver dishes 53 on the conveyances 33, 35, 37, or on buildings 31, or on individual monitors 10. The satellite 50 retransmits 55 or bundles and transmits the signals 53 to a remote security monitoring station 60. The signals may be transmitted 61 by cellular telephone 63 or land lines 65 or on dedicated or shared channels from the protected buildings 31 with protected containers 40 or from the conveyances 33, 35, 37 to a local data concentrator 80, which retransmits or bundles and transmits the signals by a satellite transceiver 81 or land lines 83 or cellular telephone lines or dedicated or shared communication channels to the remote security monitoring station 60.

A unique feature of the new monitor 10 is the use of a polled time dependant pseudo random number or a number from a time pad. Lists of random numbers related to time on time pads are often used in encryption. This number changes once an hour or whatever time interval is deemed timely by the particular application. The remote monitoring station 60 sends signals 55 requesting an individual monitor 10 or a group of monitors respond. The monitor 10 responds with the random number that is dependant on the time the monitor was started and how much time has elapsed.

Figure 2:
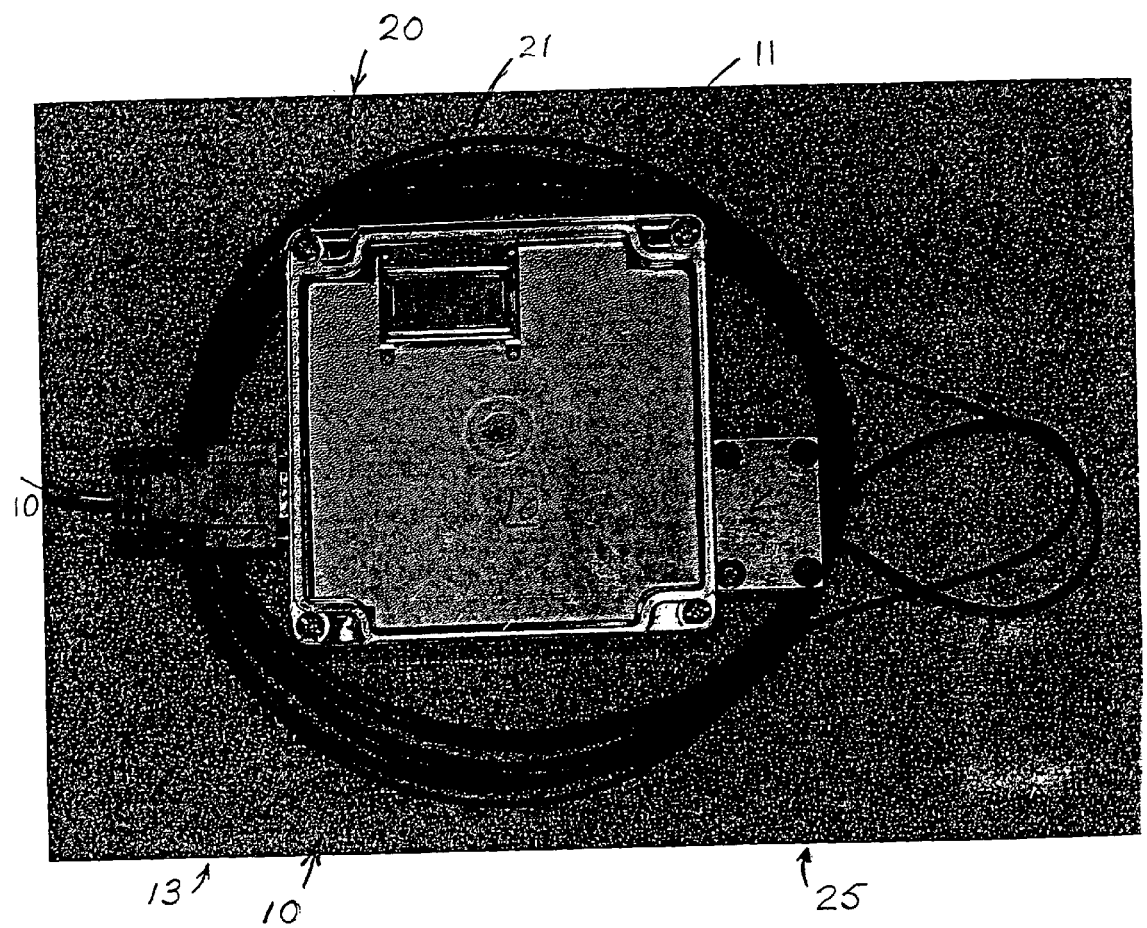
FIG. 2 shows the new monitor with a seal and a communications line.

FIG. 2 shows the new monitor 10 with a seal 20 and a communications line 110. FIG. 2 shows a monitor case 11 and a coil 21 of 25 feet of fiber-optic cable 20 with both ends crimped into a Fiber-Lock seal 25, which is inserted into the right side of the monitor 10. There is also a RS-232 communications cable 13 plugged into the left side of the monitor 10, which is used for the remote monitoring.

Figure 3:
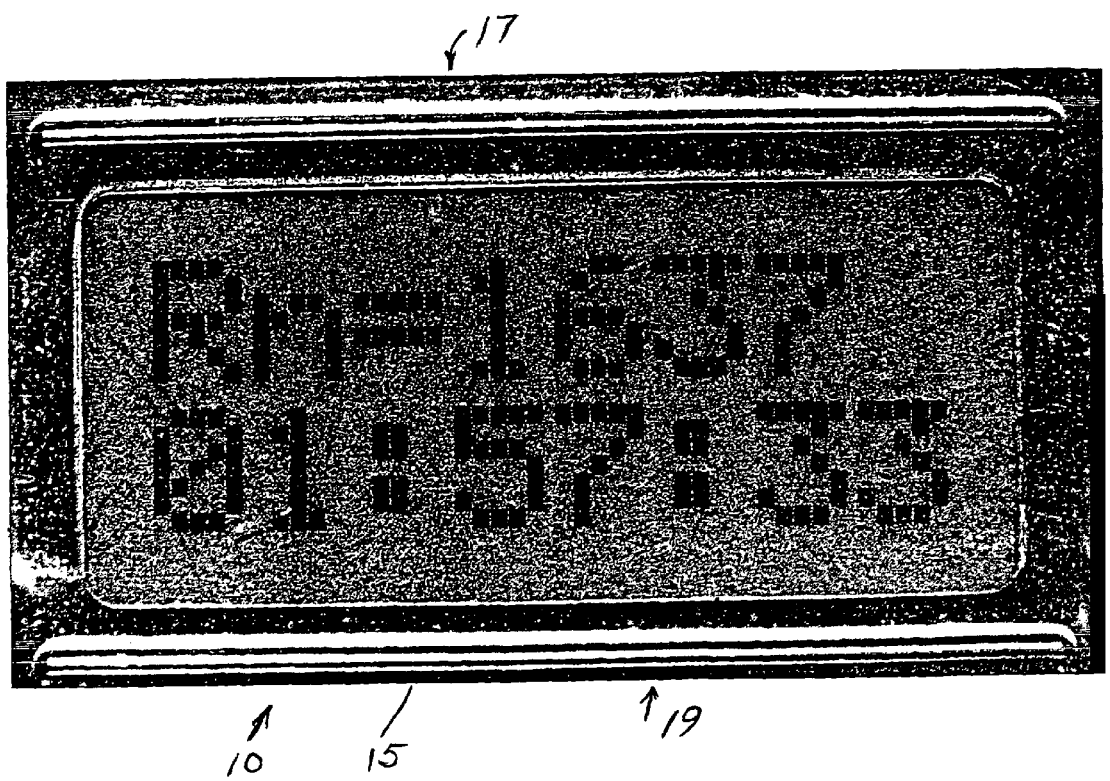
FIG. 3 shows a display on the new monitor.

FIG. 3 shows a display 15 on the new monitor 10. The optional display displays seal status 17 and time 19.

Figure 4:
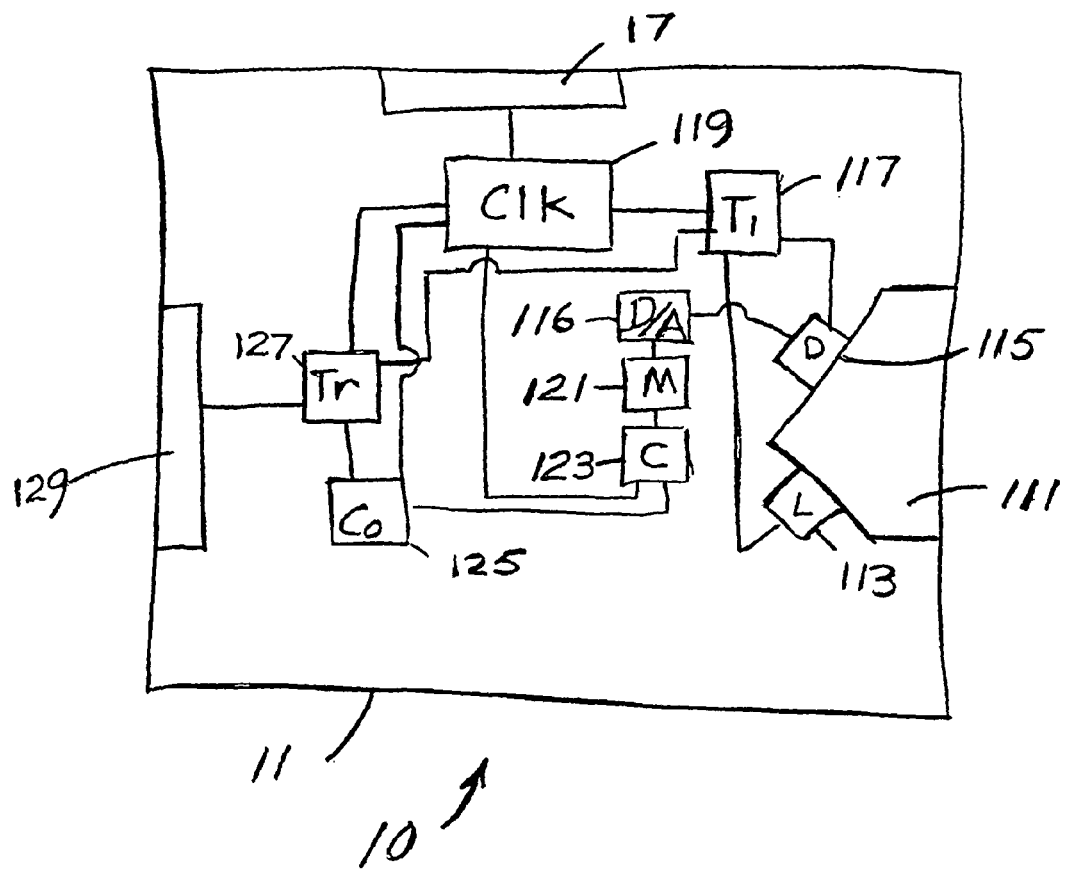
FIG. 4 is a schematic representation of the new monitor and seal.

FIG. 4 is a schematic representation of the new monitor 10 and seal 20. The monitor has a case 11 with a receiver 111 for ends of a seal fiber optic cable 20, such as in a block 25. A LED 113 or plural LEDs are mounted near the receiver 111 to communicate with grouped ends of the fibers. A detector 115 is mounted near the opposite ends of the fibers. The LED and detector are connected to a timer 117, which is connected to clock 119. The detector is also connected to a memory 121 and to a comparator 123. The comparator is connected to a variable code source 125, which is also connected to the clock. A transceiver 127 is connected to the code source and to the clock. The transceiver is connected to the data port 129 and is also connected to the timer 117 for starting the timer in response to a received query.

FIG. 5 shows steps in use and operations of the monitor 10. The fiber-optic monitor circuit works as described in FIG. 5.

The monitor 10 detects 115 and measures the amount of light (digital value) in the fiber-optic cable 20 with the LED 113 off and compares the value to previous LED off values in memory 121 to detect tampering.

If tampering is detected, the comparator 123 keys the clock 119 to send a time signal without a code via transceiver 127.

Immediately after a successful integrity "LED off" reading is completed the monitor turns the LED 113 on.

The monitor then detects 115 and measures the light level on the other end of the cable from the LED and compares 123 it to previous LED on values in the memory 121 to detect tampering.

The LED is turned off and the monitor cycle starts over after 1/10 of a second delay. The time interval between monitor cycles can be changed depending on the application and the power available to the monitor.

The LED is on for about 80 microseconds, and the power consumption of the fiber-optic monitoring side of the circuit is minimal, even though the LED draws significant current. A photo-diode is used as the detector 115, and the measurements are made by a 10-bit analog to digital converter 116.

An independent reporting cycle runs concurrently with the monitoring cycle. Every 5 seconds the monitor 10 turns on its communications port 129 and checks to see of it is being polled or queried.

If it is being polled, the monitor 10 sends the current value of the time dependant random number.

If the random number is not correct, the remote monitor 60, see FIG. 1, requests that the internal clock's time value be sent to verify that the monitor's internal clock is functioning correctly. If the monitor gets very cold, for instance, the clock's value may drift from the correct value.

The communications port 129 is turned off for another 5-second cycle. The 5-second interval can be modified as need by the application.

The monitor runs up to 18 months or more on internal batteries.

The monitor 10 monitors any fiber-optic loop. It does not have to monitor a Fiber Lock seal.

Figure 6:
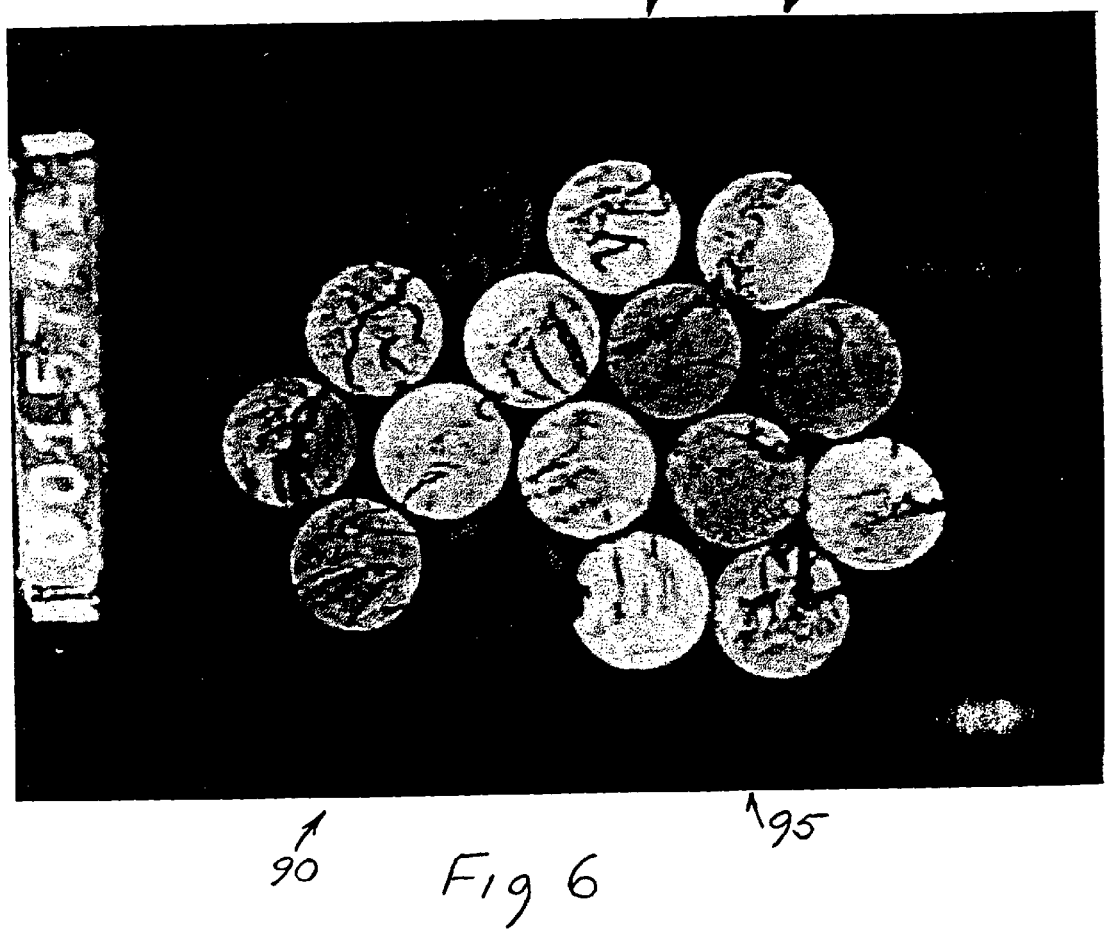
FIG. 6 is a photomicrograph of a unique fingerprint of clamped ends of fibers in an optical fiber bundle seal.
Figure 7:
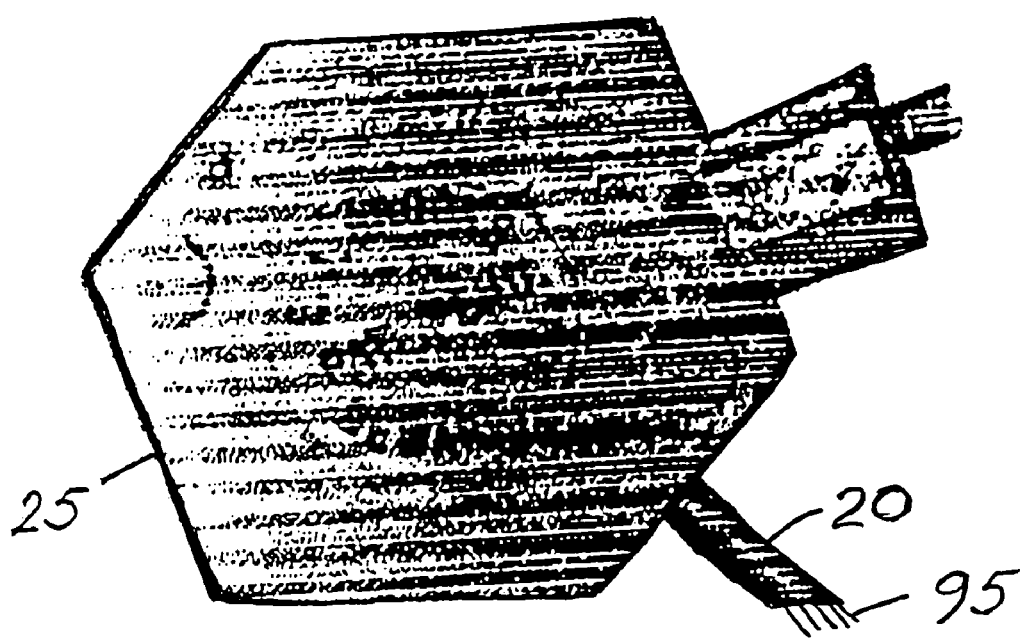
FIG. 7 shows an end of a Fiber Lock seal.

FIG. 6 is a photomicrograph 90 of a unique fingerprint 91 of clamped ends 93 of fibers 95 in an optical fiber bundle 97 of seal 20. The photomicrograph of the fiber-optic bundle on the Fiber Lock seal shows the unique fracture patterns 99 on the ends 93 of the individual fibers 95. Taking a picture like FIG. 6 allows the seal 20 to be verified in the field and at the destination by comparing the picture 90 to a picture taken previously and stored in a memory right after the seal is applied.

The E. J. Brooks/Fiber Lock Sealing system has a jacketed bundle 20 of light transmitting optical fibers 95 whose two ends are securely held in a tamper-resistant plastic block 25.

One thing that is unique about the new monitor 10 is the use of a polled time dependant pseudo random number or a number from a time pad (a list of random numbers often used in encryption) in code source 125. This number changes once an hour or whatever time interval is deemed timely by the particular application. Remote monitoring station 60 sends a request to the monitor 10, and the monitor responds with the random number that is dependant on the time the monitor was started and how much time has elapsed.

The electronic monitor 10, which transmits a light pulse through the fiber optic bundle 20, can detect and report either locally or remotely seal integrity and status. After the seal is assembled, there is also a means of uniquely identifying each seal based on a digital image of the physical and optical properties of the individual fibers of the bundle.

Several new features are created by use of the Fiber Lock seals and the new monitors. Multiple objects can be sealed and monitored with a single length of fiber optic and one seal body and monitor. Fiber optic cable lengths of up to 50 m or longer can be monitored.

The electronic monitor output is adaptable to a variety of user specific applications. The local LCD display 17 displays status. Output can be phoned in, even on a cell phone, over an unsecured line, and seal integrity can be verified.

The electronic seal monitor 10 is configured to display seal status on a local LCD display 17 or to communicate the encrypted seal status to remote monitoring stations. Photomicrography of seal fiber bundle produces a unique fingerprint.

The monitors 10 are reusable, however, the seals 20 are not.

In the event that the electronic monitor 10 is harassed and fails or fails from natural causes, the integrity of the seal 20 can be established by comparing the seal's original fingerprint with a stored image of the end of the fiber optic bundle prior to removing the seal 20.

While the invention has been described with reference to specific embodiments, modifications and variations of the invention may be constructed without departing from the scope of the invention, which is defined in the following claims.

The invention claimed is:

1. A method of sealing a container comprising:
connecting the fiber optic cable to the container,
connecting a light source to a first end of the cable,
connecting a photodetector to a second end of the cable,
reading dark output of the photodetector,
pulsing the light source,
reading light output of the photodetector,
storing the dark output and the light output in memory,
comparing, at intervals, current dark output of the photodetector with stored dark output,
pulsing the light source,
comparing light output of the photodetector with stored light output of the photodetector, and
reporting results of the comparing.

2. The method of claim 1, further comprising recording a fingerprint of a fiber optic cable and comparing a later fingerprint of the fiber optic cable with the recorded finger print.

3. The method of claim 1, wherein the light source comprises an LED.

4. The method of claim 1, further comprising amplifying output of the photodetector and converting the output from analog to digital before the storing.

5. The method of claim 1, wherein the reporting further comprises providing time dependent random numbers from a random number generator and transmitting a time dependent generated random number upon matching comparison of the dark and light outputs.

6. The method of claim 5, further comprising receiving a query signal from a remote monitor and wherein the transmitting comprises transmitting the generated random number in response to the query.

7. A container sealing method comprising:
securing a container with a light transmitting seal,
monitoring the seal by pulsing light through the seal,
reading light output from the seal,
generating random numbers from a time pad,
remotely requesting the monitoring,
responding to the requesting with a generated random number according to time when the seal is intact, and
failing to respond or responding with an incorrect number when the seal has been tampered with.

8. The method of claim 7, further comprising recording the light output reading and comparing the reading with previous readings.

9. The method of claim 8, wherein the pulsing comprises pulsing an LED on for milliseconds.

10. The method of claim 8, further comprising pulsing the light at intervals and recording light output at intervals and reporting non-comparing readings.

11. The method of claim 8, further comprising periodically reading dark output from the seal without pulsing the light and recording the dark output readings and comparing the dark output readings with the recorded dark output readings.

12. The method of claim 7, further comprising remotely monitoring containers on trains, box cars, trucks, warehouses and ships with local data concentrators and reporting data from the local data concentrators to a remote monitoring station.

13. A monitor for optical fiber cables comprising:
optical fibers having first and second ends,
an LED connect to the first ends of fibers,
a detector connected to the second ends of the fibers,
a timer connected to the LED and to the detector,
an amplifier connected to the detector,
an analog-to-digital converter connected to the amplifier,
a memory connected to the converter,
a comparator connected to the memory and to the converter for comparing present outputs with past outputs in the memory,
a clock connected to the comparator, to the LED, and to the detector for keying the LED, the detector and the comparator, and
a variable code source connected to the comparator and to the clock for outputting a time dependent code upon an agreement of outputs in the comparator.

14. The apparatus of claim 13, further comprising a transceiver connected to the variable code source, to the clock, and to the timer for starting a light, detector, comparator sequence in response to a received query, and connected to the comparator or the variable code source for transmitting the time dependent code upon the agreement in the comparator.

15. A method of sealing a container comprising inserting a cable end, starting a clock, transmitting time and code, detecting dark light, storing dark light, detecting LED light, storing LED light, receiving poll, starting a timer, detect dark light, comparing detected dark light with stored dark light, lighting LED, detecting lighted light, comparing lighted light with the stored lighted light, when the dark lights and the lighted lights match, outputting a time dependent output code, and when either lights do not match outputting time, no output, or an alarm.

* * * * *